(12) United States Patent
Liu et al.

(10) Patent No.: US 9,512,716 B2
(45) Date of Patent: Dec. 6, 2016

(54) SYSTEM AND METHOD FOR REGULATING AN ELECTROMAGNETIC TELEMETRY SIGNAL SENT FROM DOWNHOLE TO SURFACE

(71) Applicant: EVOLUTION ENGINEERING INC., Calgary (CA)

(72) Inventors: Jili Liu, Calgary (CA); David A. Switzer, Calgary (CA); Jinhua Wang, Calgary (CA); Aaron W. Logan, Calgary (CA)

(73) Assignee: EVOLUTION ENGINEERING INC. (CA)

( * ) Notice: Subject to any disclaimer, the term of this patent is extended or adjusted under 35 U.S.C. 154(b) by 0 days.

(21) Appl. No.: 14/771,791

(22) PCT Filed: Mar. 5, 2014

(86) PCT No.: PCT/CA2014/050172
§ 371 (c)(1),
(2) Date: Aug. 31, 2015

(87) PCT Pub. No.: WO2014/134727
PCT Pub. Date: Sep. 12, 2014

(65) Prior Publication Data
US 2016/0017706 A1    Jan. 21, 2016

Related U.S. Application Data

(60) Provisional application No. 61/773,088, filed on Mar. 5, 13.

(51) Int. Cl.
| | |
|---|---|
| *G01V 3/00* | (2006.01) |
| *E21B 47/12* | (2012.01) |
| *H04W 52/36* | (2009.01) |
| *G01V 11/00* | (2006.01) |
| *E21B 47/18* | (2012.01) |

(52) U.S. Cl.
CPC ............ *E21B 47/122* (2013.01); *E21B 47/12* (2013.01); *H04W 52/367* (2013.01); *E21B 47/18* (2013.01); *G01V 11/002* (2013.01)

(58) Field of Classification Search
CPC ........ E21B 47/12; E21B 47/18; E21B 47/122; H04W 52/367; G01V 11/002
(Continued)

(56) References Cited

U.S. PATENT DOCUMENTS

| | | | | |
|---|---|---|---|---|
| 4,739,325 A | * | 4/1988 | MacLeod | E21B 17/003 324/342 |
| 5,130,706 A | * | 7/1992 | Van Steenwyk | E21B 47/122 175/40 |

(Continued)

FOREIGN PATENT DOCUMENTS

| | | |
|---|---|---|
| CA | 2584671 A1 | 10/2007 |
| CA | 2584671 C | 2/2009 |
| CA | 2838558 A1 | 11/2012 |

OTHER PUBLICATIONS

International Search Report for PCT/CA2014/050172, mailed on May 12, 2014.

*Primary Examiner* — Amine Benlagsir
*Assistant Examiner* — Adnan Aziz
(74) *Attorney, Agent, or Firm* — George C. Rondeau, Jr.; Davis Wright Tremaine LLP

(57) ABSTRACT

A method for regulating an electromagnetic ("EM") telemetry signal sent from downhole to surface includes determining a value of a controlled parameter of the EM telemetry signal, comparing the value of the controlled parameter to a configuration value, and adjusting the value of the controlled parameter in a first direction towards the configuration value while monitoring a feedback parameter of the EM telemetry signal when the value of the controlled parameter and the configuration value differ. The controlled parameter is one of transmission voltage and transmission current, and the feedback parameter is the other of transmission voltage and transmission current. The value of the (Continued)

controlled parameter ceases to be adjusted in the first direction upon the earlier of either of the following occurring: the value of the controlled parameter substantially equals the configuration value, a value of the feedback parameter meets a feedback parameter cutoff threshold, and a product of the controlled and feedback parameters meets a power cutoff threshold.

17 Claims, 8 Drawing Sheets

(58) Field of Classification Search
USPC ............................... 340/853.2, 853.7, 854.6
See application file for complete search history.

(56) References Cited

U.S. PATENT DOCUMENTS

| | | | |
|---|---|---|---|
| 6,937,159 B2* | 8/2005 | Hill | E21B 47/12 340/854.4 |
| 7,080,699 B2* | 7/2006 | Lovell | E21B 17/003 166/66.5 |
| 7,649,474 B1* | 1/2010 | Gard | E21B 47/122 340/854.3 |
| 8,629,782 B2* | 1/2014 | Li | E21B 47/12 340/853.1 |
| 2004/0104047 A1* | 6/2004 | Peter | E21B 17/003 175/40 |
| 2005/0072565 A1* | 4/2005 | Segura | E21B 49/10 166/100 |
| 2007/0052551 A1 | 3/2007 | Lovell et al. | |
| 2007/0247328 A1* | 10/2007 | Petrovic | G01V 11/002 340/853.7 |
| 2009/0289808 A1* | 11/2009 | Prammer | E21B 17/003 340/853.7 |
| 2011/0132607 A1* | 6/2011 | Lahitette | E21B 43/119 166/297 |
| 2012/0161848 A1 | 6/2012 | Jain | |
| 2012/0268074 A1* | 10/2012 | Cooley | H01G 11/58 320/130 |
| 2013/0271066 A1* | 10/2013 | Signorelli | H02J 7/0042 320/107 |

* cited by examiner

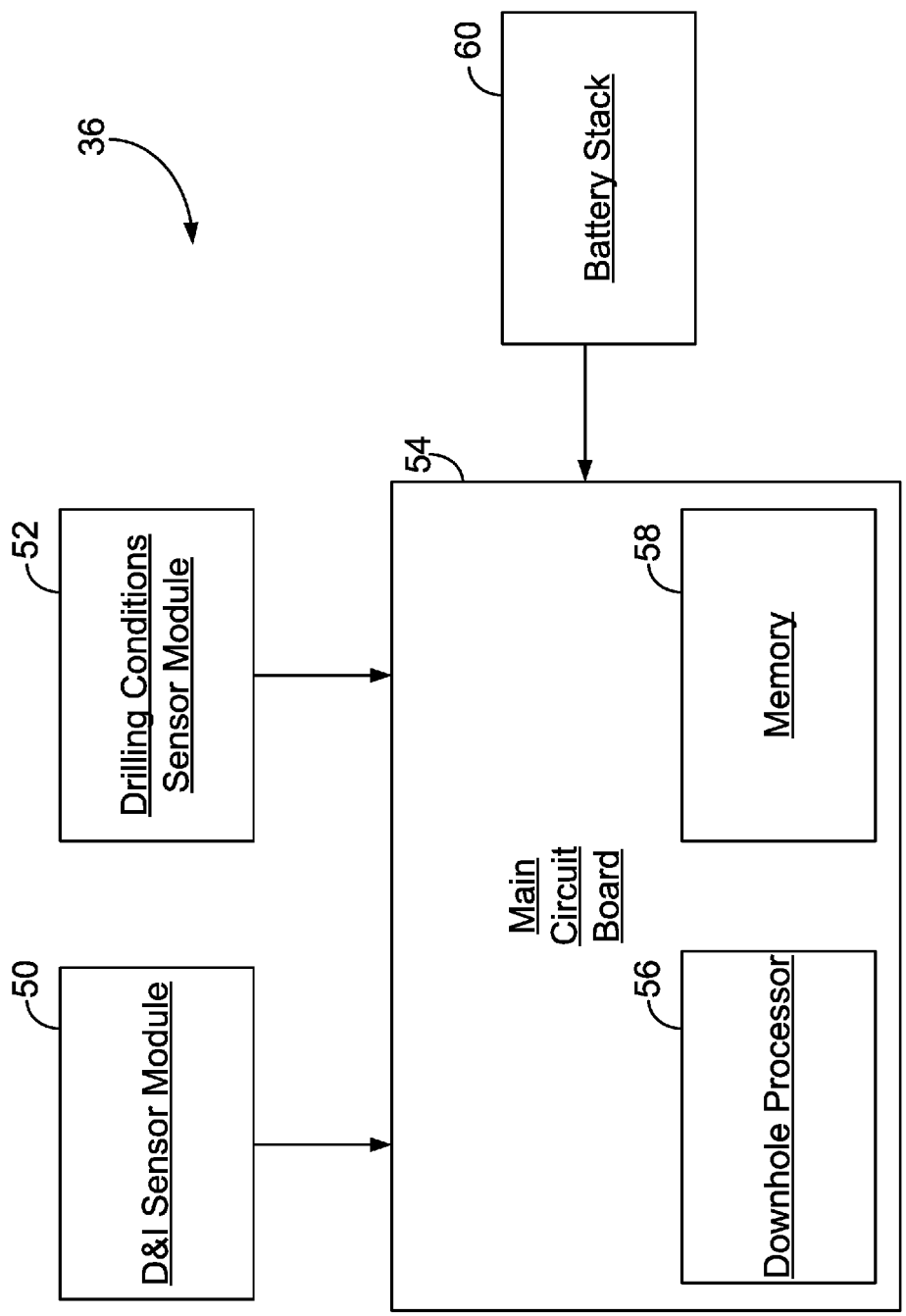

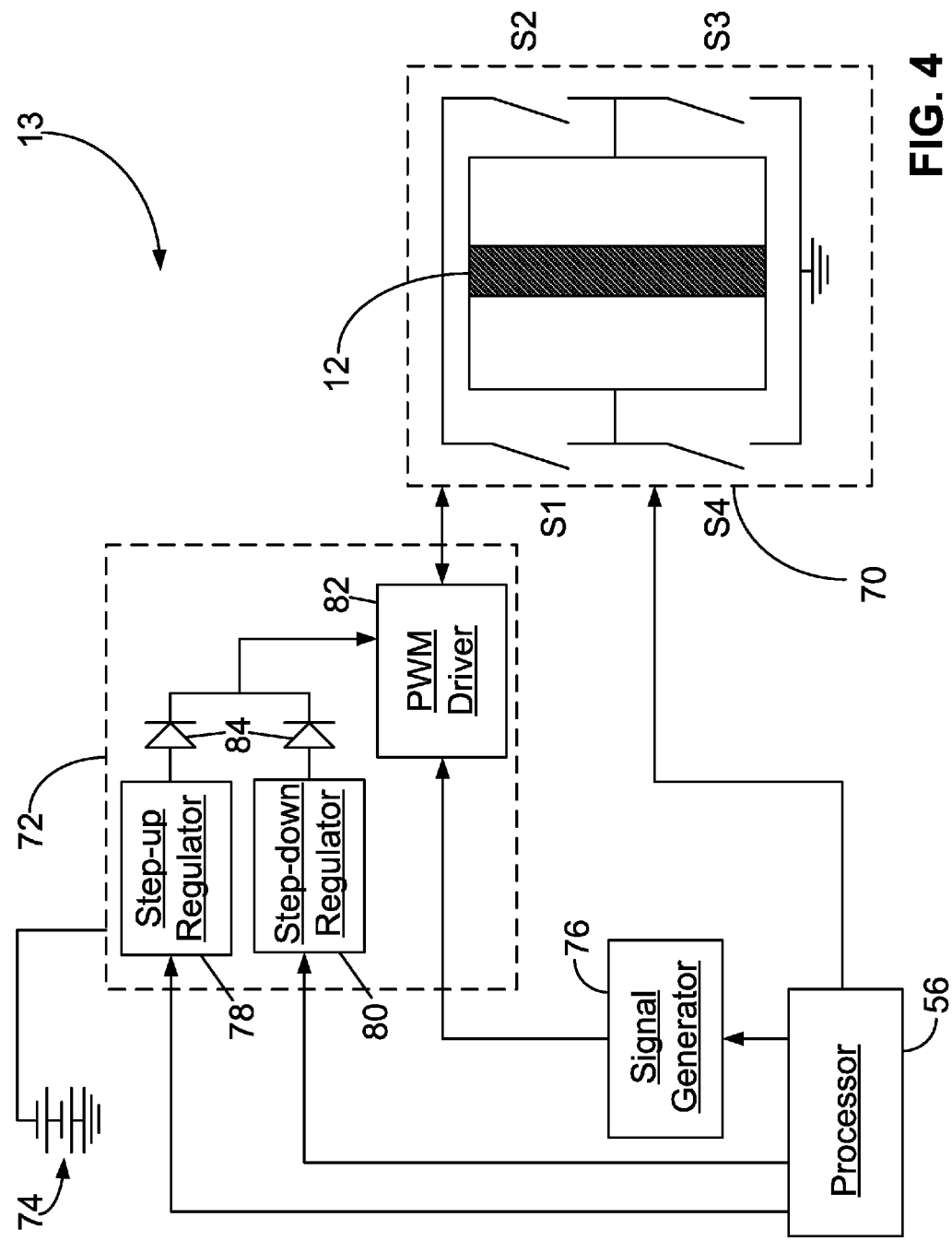

SYSTEM AND METHOD FOR REGULATING AN ELECTROMAGNETIC TELEMETRY SIGNAL SENT FROM DOWNHOLE TO SURFACE

TECHNICAL FIELD

The present disclosure is directed at systems, methods, and techniques for regulating an electromagnetic telemetry signal sent from downhole to surface.

BACKGROUND

The recovery of hydrocarbons from subterranean zones relies on the process of drilling wellbores. The process includes using drilling equipment situated at surface and a drill string extending from equipment on the surface to a subterranean zone of interest such as a formation. The drill string can extend thousands of meters below the surface. The downhole terminal end of the drill string includes a drill bit for drilling the wellbore. Drilling wellbores also typically involves using some sort of drilling fluid system to pump a drilling fluid ("mud") through the inside of the drill string, which cools and lubricates the drill bit and then exits out of the drill bit and carries rock cuttings back to the surface. The mud also helps control bottom hole pressure and prevents hydrocarbon influx from the formation into the wellbore and potential blow out at the surface.

Directional drilling is the process of steering a well from vertical to intersect a target endpoint or to follow a prescribed path. At the downhole terminal end of the drill string is a bottom-hole-assembly ("BHA") that includes 1) the drill bit; 2) a steerable downhole mud motor; 3) sensors including survey equipment (e.g. one or both of logging-while-drilling ("LWD") and measurement-while-drilling ("MWD") tools (both "LWD" and "MWD" are hereinafter collectively referred to as "MWD" for simplicity)) to evaluate downhole conditions as drilling progresses; 4) telemetry equipment to transmit data to surface; and 5) other control equipment such as stabilizers or heavy weight drill collars. The BHA is conveyed into the wellbore by a string of metallic tubulars known as drill pipe. The MWD equipment is used to provide in a near real-time mode downhole sensor and status information to the surface while drilling. This information is used by the rig operator to make decisions about controlling and steering the drill string to optimize the drilling speed and trajectory based on numerous factors, including lease boundaries, existing wells, formation properties, hydrocarbon size and location, etc. This can include making intentional deviations from the planned wellbore path as necessary based on the information gathered from the downhole sensors during the drilling process. The ability to obtain real-time data allows for a relatively more economical and more efficient drilling operation.

MWD is performed using MWD tools, each of which contains a sensor package to survey the wellbore and to send data back to the surface by various telemetry methods. Such telemetry methods include, but are not limited to telemetry via a hardwired drill pipe, acoustic telemetry, telemetry via a fiber optic cable, mud pulse ("MP") telemetry and electromagnetic ("EM") telemetry.

A typical arrangement for EM telemetry uses parts of the drill string as an antenna. The drill string is divided into two conductive sections by including an electrically insulating joint or connector (a "gap sub") in the drill string. The gap sub is typically placed within the BHA such that metallic drill pipe in the drill string above the gap sub serves as one antenna element and metallic sections below the gap sub serve as another antenna element. EM telemetry signals can then be transmitted by applying electrical signals across the two antenna elements. The signals typically include very low frequency signals applied in a manner that codes information for transmission to the surface. The electromagnetic signals may be detected at the surface, for example by measuring electrical potential differences between the drill string and one or more ground rods spaced from the drill string.

SUMMARY

According to a first aspect, there is provided a method for regulating an EM telemetry signal sent from downhole to surface, which comprises determining a value of a controlled parameter of the EM telemetry signal, wherein the controlled parameter comprises one of transmission voltage and transmission current; comparing the value of the controlled parameter to a configuration value; when the value of the controlled parameter differs from the configuration value, adjusting the value of the controlled parameter in a first direction towards the configuration value while monitoring a feedback parameter of the EM telemetry signal, wherein the feedback parameter comprises the other of the transmission voltage and transmission current and varies in response to variations of the controlled parameter; and ceasing to adjust the value of the controlled parameter in the first direction upon the earlier of the following occurring: (i) the value of the controlled parameter substantially equals the configuration value; (ii) a value of the feedback parameter meets a feedback parameter cutoff threshold; and (iii) a product of the controlled and feedback parameters meets a power cutoff threshold.

Monitoring the feedback parameter may comprise measuring the feedback parameter every half cycle of the EM telemetry signal.

In one aspect, the controlled parameter may be voltage and the feedback parameter may be current. The feedback parameter may meet the feedback parameter cutoff threshold when the current exceeds a current ceiling. The current ceiling may vary inversely with resistance of a formation through which the EM telemetry signal propagates.

In another aspect, the controlled parameter may be current and the feedback parameter may be voltage. The feedback parameter may meet the feedback parameter cutoff threshold when the voltage exceeds a voltage ceiling. The voltage ceiling may vary directly with distance the EM telemetry signal travels from downhole to surface. The feedback parameter may meet the feedback parameter cutoff threshold when the voltage is less than a voltage floor. The voltage floor may vary directly with distance the EM telemetry signal travels from downhole to surface.

When commencing transmission of the EM telemetry signal, the amplitude of the signal may be gradually increased towards a target amplitude. The amplitude of the signal may increase by a certain percentage per cycle.

The method may further comprise determining whether a short circuit is present. When the short circuit is present, the method: (i) decreases the amplitude of the signal to zero; (ii) waits a delay period; and (iii) recommences transmission of the signal.

The method may further comprise generating a regulated voltage output, and powering sensors that obtain measurements for transmission to surface via the signal using the regulated voltage output.

According to another aspect, there is provided a system for regulating an EM telemetry signal sent from downhole to surface, which comprises an EM signal transmitter configured to generate the EM telemetry signal; and an electronics subassembly communicative with the EM signal transmitter. The subassembly comprises a processor and a memory having encoded thereon statements and instructions to cause the processor to perform any of the foregoing methods. The system may further comprise a gap sub, and the EM signal transmitter may comprise an H-bridge circuit electrically coupled to positive and negative ends of the gap sub such that applying a voltage across a positive pathway of the H-bridge circuit generates the positive polarity EM pulse, and applying a voltage across a negative pathway of the H-bridge circuit generates the negative polarity EM pulse. The EM signal transmitter may further comprise a voltage regulator electrically coupled to the H-bridge circuit, a power source coupled to the voltage regulator, and a signal generator communicative with the voltage regulator, the H-bridge circuit, and the electronics subassembly. The signal generator is configured to receive the control signal from the processor and send a polarity control signal to the H-bridge circuit and a voltage output and timing control signal to the voltage regulator. The electronics subassembly may further comprise a sensor and a sensor voltage regulator electrically coupled to the sensor, wherein the sensor voltage regulator produces a regulated voltage output to power the sensor.

According to another aspect, there is provided a method for regulating an EM telemetry signal sent from downhole to surface, which comprises entering a high voltage mode or a low voltage mode; and generating the signal using a high voltage if in the high voltage mode and generating the signal using a low voltage if in the low voltage mode. The method may further comprise entering the high voltage mode or the low voltage mode in accordance with a setting stored in a configuration file. The method may further comprise determining impedance of drilling mud used during drilling. When the impedance is above a high impedance threshold, the high voltage mode is entered; and when the impedance is below the high impedance threshold, the low voltage mode is entered. The high voltage may be generated by stepping up a battery voltage and the low voltage may be generated by stepping down the battery voltage.

According to another aspect, there is provided a system for regulating an EM telemetry signal sent from downhole to surface, which comprises a battery; an EM signal transmitter configured to generate the EM telemetry signal, wherein the EM signal transmitter comprises a step-up voltage regulator and a step-down voltage regulator each of which is electrically coupled to the battery; and an electronics subassembly communicative with the EM signal transmitter and comprising a processor and a memory having encoded thereon statements and instructions to cause the processor to perform a method comprising (i) enabling only one of the step-up and step-down voltage regulators; and (ii) generating the signal using a voltage output by the voltage regulator that is enabled. The system may further comprise a downhole receiver communicative with the processor, and the method may further comprise enabling the step-up or step-down voltage regulator in response to a downlink signal received from the surface. The method may further comprise determining impedance of drilling mud used during drilling; when the impedance is above a high impedance threshold, the step-up voltage regulator is enabled; and when the impedance is below the high impedance threshold, the step-down voltage regulator is enabled.

According to another aspect, there is provided a non-transitory computer readable medium having encoded thereon statements and instructions to cause a processor to perform any of the foregoing methods.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more exemplary embodiments:

FIG. 3 is a schematic block diagram of components of an electronics subassembly of the EM telemetry tool.

FIG. 4 is a schematic of an EM signal transmitter of the EM telemetry tool.

DETAILED DESCRIPTION

Directional terms such as "top," "bottom," "upwards," "downwards," "vertically," and "laterally" are used in the following description for the purpose of providing relative reference only, and are not intended to suggest any limitations on how any article is to be positioned during use, or to be mounted in an assembly or relative to an environment.

Figure 1:
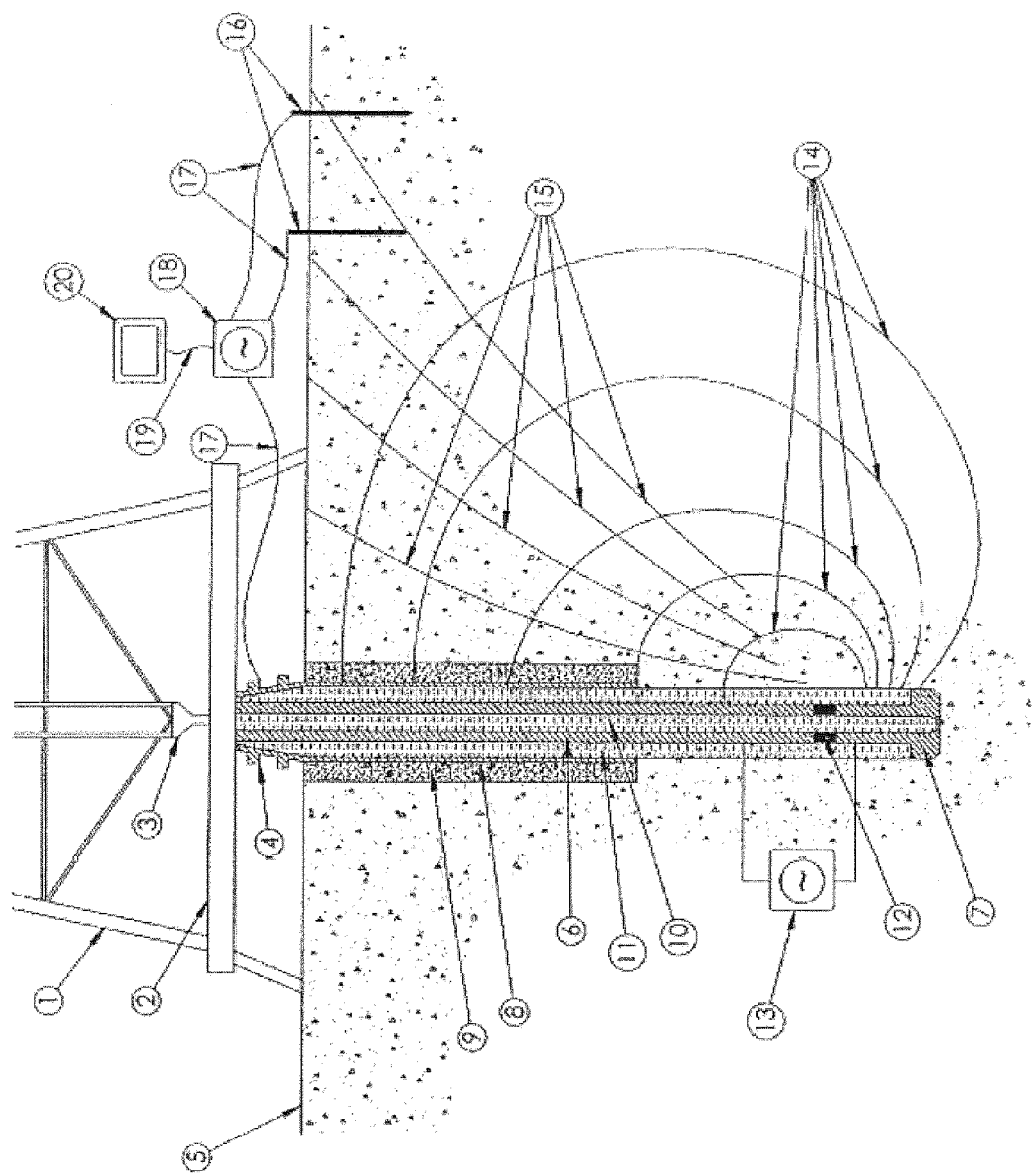
FIG. 1 is schematic side view of an EM telemetry system in operation, according to one embodiment.

Referring to FIG. 1, there is shown a schematic representation of an EM telemetry system in which embodiments of a system and method for regulating an EM telemetry signal can be employed. Downhole drilling equipment including a derrick 1 with a rig floor 2 and draw works 3 facilitates rotation of drill pipe 6 into the ground 5. The drill pipe 6 is enclosed in casing 8 which is fixed in position by casing cement 9. Bore drilling fluid 10 is pumped down the drill pipe 6 and through an electrically isolating gap sub assembly 12 to drill bit 7. Annular drilling fluid 11 is then pumped back to the surface and passes through a blow out preventer ("BOP") 4 positioned above the ground surface. The gap sub assembly 12 may be positioned at the top of the BHA, with the BHA and the drill pipe 6 each forming an antennae for the dipole antennae. The gap sub assembly 12 is electrically isolated ("nonconductive") at its center joint effectively creating an insulating break, known as a gap, between the bottom of the drill string with the BHA and the larger top portion of the drill string that includes the rest of the drill pipe 6 up to the surface. A very low frequency alternating electrical current 14 is generated by an EM signal transmitter 13 and driven across the gap sub assembly 12 to generate discrete pulses which carry encoded telemetry data ("EM telemetry transmission"). The low frequency AC voltage and magnetic reception is controlled in a timed/coded sequence to energize the earth and create an electrical field 15. Communication cables 17 transmit the measurable voltage differential from the top of the drill string and various surface grounding rods 16 located about the drill site to surface receiving and processing equipment 18 which receives and processes the EM telemetry transmission. The grounding rods 16 are generally randomly located on site with some attention to site operations and safety. The EM telemetry transmission is decoded and a receiver box communication cable 19 transmits the data to a computer display 20 after decoding, thereby providing measurement while drilling information to the rig operator.

Figure 2:
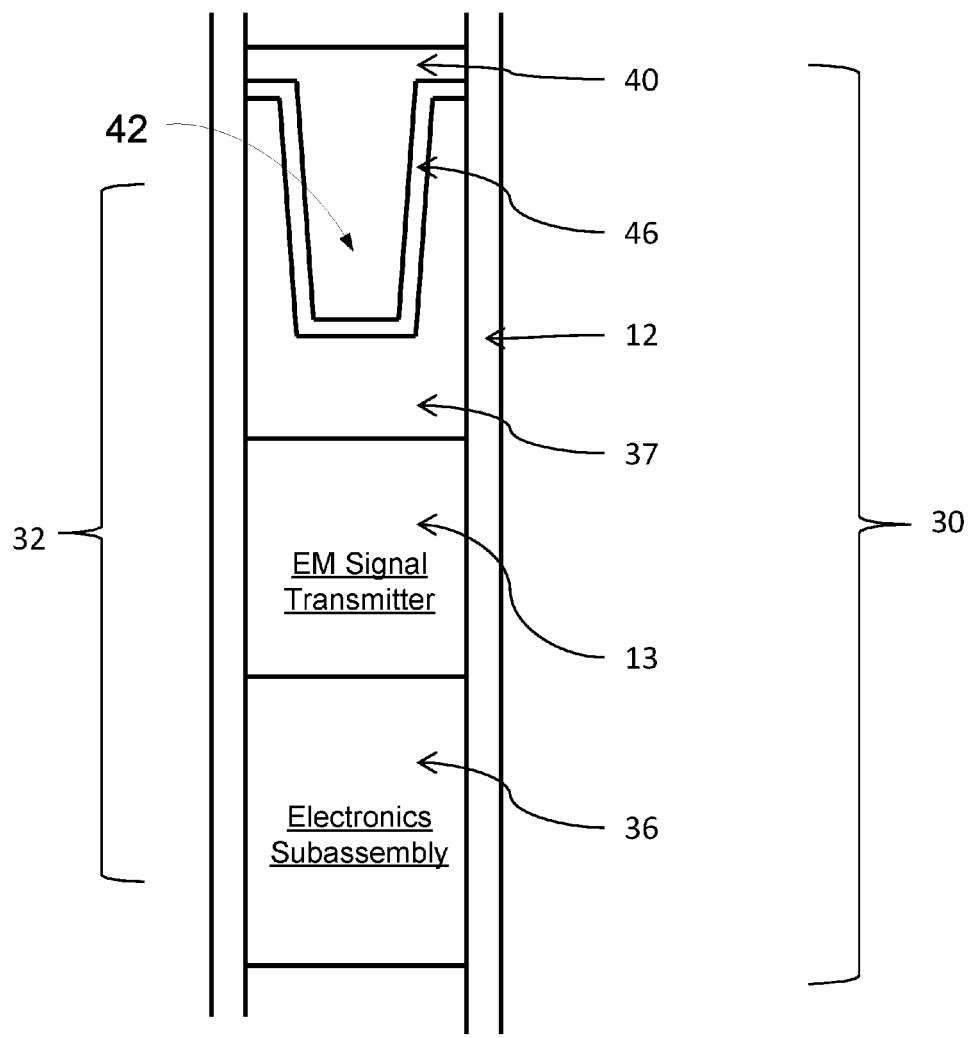
FIG. 2 is a schematic block diagram of components of a downhole EM telemetry tool of the EM telemetry system according to another embodiment.

Referring now to FIG. 2, an EM telemetry system 30 according to one embodiment comprises a downhole EM telemetry tool 32 and the surface receiving and processing equipment 18. The EM telemetry tool 32 generally comprises the gap sub assembly 12, the EM signal transmitter 13, and an electronics subassembly 36. The electronics subassembly 36 houses sensors for taking downhole measurements as well as a processor and memory, which contains program code executable by the processor to encode the sensor measurements into telemetry data and send control signals to the EM signal transmitter 13 to transmit EM pulses to surface. The surface receiving and processing equipment 18 can comprise equipment to receive the pulses, filter and process the pulses, and decode the pulses into the telemetry data.

The gap sub assembly 12 comprises an electrically conductive female member 37 comprising a female mating section and an electrically conductive male member 40 comprising a male mating section 42. The male mating section 42 is matingly received within a female mating section of the female member 37 and electrically isolated therefrom by an electrical isolator 46. The electrical isolator 46 comprises electrical insulating material that is positioned in between the male and female mating sections. The electrical isolator 46 thereby electrically isolates the male member 40 from the female member 37 and the male member 40, female member 37 and electrical isolator 46 together function as the gap sub assembly 12 for EM telemetry.

Referring to FIG. 3, the electronics subassembly 36 includes sensors for taking various downhole measurements, and encoding and processing equipment for encoding the measurements and other information (collectively "telemetry data") into a telemetry signal for transmission by the EM signal transmitter 13. More particularly, the electronics subassembly 36 comprises a tubular housing (not shown) and the following components housed inside the housing: a directional and inclination ("D&I") sensor module 50; drilling conditions sensor module 52; a main circuit board 54 containing a master processing unit (MPU or otherwise referred to as the "downhole processor") 56 and an integrated (shown) or separate (not shown) data encoder, a memory 58 having stored thereon program code executable by the downhole processor 56, one or more power amplifiers (not shown); and a battery stack 60. The downhole processor 56 can be any suitable processor known in the art for EM tools, and can be for example, a dsPIC33 series MPU. The power amplifiers can be, for example, a power MOSFET H-bridge design configured to transmit data.

The D&I sensor module 50 comprises three axis accelerometers, three axis magnetometers and associated data acquisition and processing circuitry. Such D&I sensor modules are well known in the art and thus are not described in detail here.

The electronics subassembly 36 includes sensors and circuitry for taking various measurements of borehole parameters and conditions including gamma, temperature, pressure, shock, vibration, RPM, and directional parameters. Such sensors and circuitry are also well known in the art and thus are not described in detail here.

The main circuit board 54 can be a printed circuit board with electronic components soldered on the surface of the board 54. The main circuit board 54 and the sensor modules 50, 52 are secured on a carrier device (not shown) which is fixed inside the electronics subassembly housing by end cap structures (not shown). The sensor modules 50, 52 are each electrically communicative with the main circuit board 54 and send measurement data to the downhole processor 56. As will be described below, the memory 58 of the electronics subassembly contains program code that is executed by the downhole processor 56 to perform a method for regulating an EM telemetry signal sent from downhole to surface. The EM telemetry signal can be transmitted by the EM signal transmitter 13 using EM pulses to represent bits of data. Different bits of data can be represented as EM pulses of different amplitudes and/or timing. The encoder program code utilizes a modulation technique that uses principles of known digital modulation techniques. In this embodiment, the encoder program code utilizes a modulation technique known as amplitude shift keying ("ASK"), timing shift keying ("TSK") or amplitude timing shift keying ("ATSK") that is a combination of amplitude shift keying and timing shift keying to encode the telemetry data into a telemetry signal comprising EM pulses. ASK involves assigning each symbol of a defined symbol set to a unique pulse amplitude. TSK involves assigning each symbol of a defined symbol set to a unique timing position in a time period. The amplitude and time position values are determined at the peak of each pulse.

Referring now to FIG. 4, the EM signal transmitter 13 is configured to generate bipolar EM pulses to carry the telemetry signal encoded by the modulation techniques discussed above. Bipolar EM pulses mean pulses that have either a positive or negative amplitude. The EM signal transmitter 13 comprises an H-bridge circuit 70 which is used to switch the polarity of the EM pulse, a step-up/step-down voltage regulator 72, a battery 74, and a signal generator 76. The voltage regulator 72 comprises separate step-up and step-down voltage regulators 78,80, a pulse width modulation driver ("PWM driver") 82, and diodes 84 that electrically connect the outputs of these voltage regulators 78,80 to the input of the PWM driver 82. The output of the PWM driver 82 is used as the output of the voltage regulator 72. The H-bridge circuit 70 enables a voltage to be applied across a load in either direction, and comprises four switches of which one pair of switches can be closed to allow a voltage to be applied in one direction ("positive pathway"), and of which another pair of switches can be closed to allow a voltage to applied in a reverse direction ("negative pathway"). In the H-bridge circuit 70 of the EM signal transmitter 13, switches S1, S2, S3, S4 are arranged so that the part of the circuit with switches S1 and S4 is electrically coupled to one side of the gap sub 12 ("positive side"), and the part of the circuit with switches S2 and S3 is electrically coupled to the other side of the gap sub 12 ("negative side"). Switches S1 and S3 can be closed to allow a voltage to be applied across the positive pathway of the gap sub 12 to generate a positive polarity pulse, and switches S2 and S4 can be closed to allow a voltage to be applied across the negative pathway of the gap sub 12 to generate a negative polarity pulse.

One end of the H-bridge circuit 70 is grounded and the other end is electrically coupled to the output of the voltage regulator 72. The voltage regulator 72 in turn is electrically coupled to the battery 74 as well as to the signal generator 76 and the processor 56. More specifically, the output of the signal generator 76 is electrically coupled to the input of the PWM driver 82, and the processor 56 outputs control signals to the step-up regulator 78 and the step-down regulator 80 to control which one is active at any given time. As described in further detail below, using the step-up and step-down voltage regulators 78,80 the voltage regulator 72 is able to adjust the strength of the EM transmission to surface.

The signal generator 76 is communicative with the downhole processor 56, and serves to receive the encoded telemetry signal from the downhole processor 56, and determine the appropriate control signals to send to the voltage regulator 72. In particular, the signal generator 76 will send voltage output and timing control signals to the voltage regulator 72 to output a voltage at a certain voltage level and timing (or at the fixed voltage level if there is no amplitude shift keying). The processor 56 sends polarity control signals to the H-bridge circuit 70 to close the appropriate switches to create a positive polarity EM pulse or a negative polarity EM pulse in conjunction with the output of the signal generator 76. When the modulation technique involves timing shift keying, the signal generator 76 and the processor 56 are configured to send the control signals at a specific timing interval pattern in accordance with the timing shift keying modulation scheme.

The signal generator 76 is capable of generating a pulse of different widths (frequencies). For example, the signal generator can generate a wide pulse using a very low frequency, e.g. below 2 Hz, and in particular, between 0.5 and 0.25 Hz. Transmitting at such low frequencies can be useful to take advantage of a natural bias towards lower frequencies in the Earth.

Figure 5A:
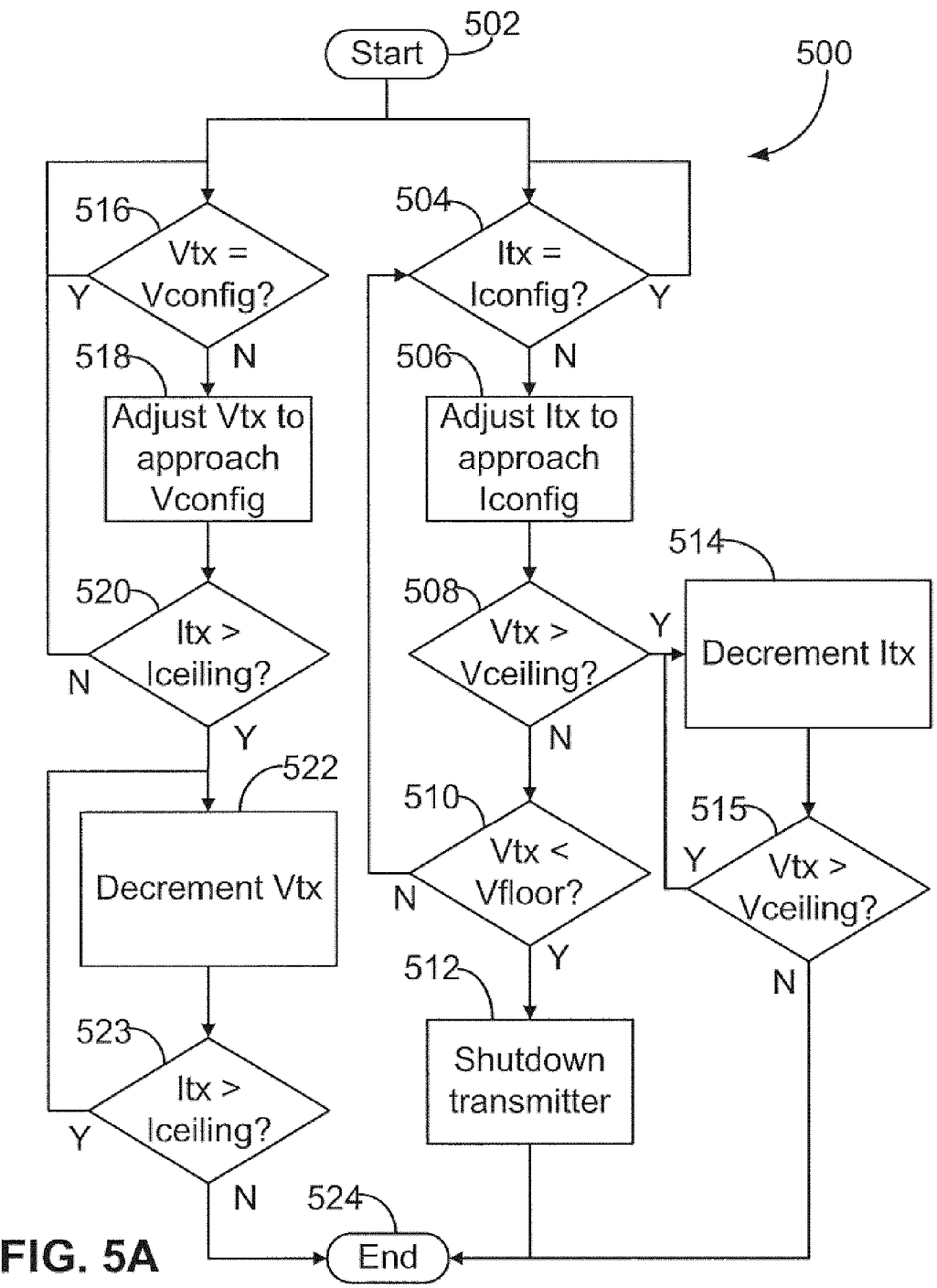
FIGS. 5A and 5B are flowcharts each depicting a method for regulating an EM telemetry signal sent from downhole to surface, according to additional embodiments.

Referring now to FIG. 5A, there is shown a method 500 for regulating the EM telemetry signal, according to another embodiment. This method 500 may, for example, be encoded as statements and instructions on the memory 58 for execution by the processor 56 using the EM signal transmitter 13. The processor 56 begins performing the method 500 at step 502 and proceeds to either step 504 if the EM signal transmitter 13 is operating in "voltage limiting mode" or step 516 if the EM signal transmitter 13 is operating in "current limiting mode". In the voltage limiting mode, the processor 56 adjusts the current that is used to generate the EM telemetry signal ("transmission current") in a first direction (i.e., by increasing or decreasing the voltage) and monitors the resulting voltage that is applied across the gap sub assembly 12 ("transmission voltage"). The processor 56 alters the transmission current if the transmission voltage exceeds certain thresholds. The ammeters and voltmeters that comprise part of the electronics subassembly 36 are used to measure the transmission current and transmission voltage. In voltage limiting mode, the transmission current is a "controlled parameter" because it is the electrical parameter that the processor 56 adjusts when adjusting the EM telemetry signal and the transmission voltage is a "feedback parameter" because it is the electrical parameter that the processor 56 monitors while adjusting the controlled parameter. Analogously, in the current limiting mode, the processor 56 adjusts the transmission voltage and monitors the transmission current, with the transmission voltage being the controlled parameter and the transmission current being the feedback parameter.

Steps 516 to 522 describe the current limiting mode. At step 516, the processor 56 compares the transmission voltage ("$V_{tx}$" in FIG. 5A) to a configuration voltage ("$V_{config}$" in FIG. 5A). The configuration voltage is stored in a configuration file stored in the memory 58. The configuration file contains a list of configuration voltages suitable for different depths of the well and may be generated based on data regarding what transmission voltages or voltage ranges were found to be suitable for use in EM telemetry in wells geographically near the well being drilled. For example, the configuration file may specify that from 0 to 500 m the transmission voltage should be 4 V; from 500 m to 1 km, 8 V; from 1 km to 1.5 km, 16 V; and from 1.5 km onwards 32 V. If the transmission voltage substantially equals the configuration voltage, then the processor 56 does not adjust the transmission voltage and loops back to step 516 in anticipation of an eventual deviation of the transmission voltage from the configuration voltage. By "substantially equals", it is meant that the transmission voltage and the configuration voltage are within a certain tolerance percentage of each other; this tolerance percentage may vary with the application and with the desires of the rig operator. Exemplary tolerance percentages include any tolerances between 0% and 10%, inclusively, such as +/−1%, +/−5%, and +/−10%.

If the transmission voltage and the configuration voltage differ, the processor 56 proceeds to step 518 where it adjusts in a first direction the transmission voltage to approach the configuration voltage. The processor 56 does this by adjusting the voltage that the signal generator 76 outputs to the voltage regulator 72. In the depicted embodiment, instead of adjusting the transmission voltage to immediately equal the configuration voltage, the processor 56 adjusts the transmission voltage in steps (e.g. in 0.25 V increments) so as to mitigate against the risk that an unexpectedly large increase in transmission current will result. For example, if the EM signal transmitter 13 is transmitting the EM telemetry signal through a formation of unexpectedly low resistance, transmitting a signal at the configuration voltage may result in a transmission current being drawn that damages the EM signal transmitter 13. The stepwise increase in the transmission voltage allows the transmission current to gradually increase, and thus protect electrical circuitry.

After adjusting the transmission voltage, the processor 56 proceeds to step 520 where it determines the transmission current ("$I_{tx}$" in FIG. 5A) and compares the transmission current to a feedback parameter cutoff threshold in the form of a current ceiling ("$I_{ceiling}$" in FIG. 5A), which is the highest current that the EM signal transmitter 13 can safely use. In the depicted embodiment, the current ceiling is approximately 8 A, although in alternative embodiments (not depicted) the current ceiling can be other values. As in the voltage limiting mode described above, the configuration file can index transmission currents by depth: for example, the transmission current from 0 to 500 m may be 1 A; from 500 m to 1 km, 2 A; from 1 km to 1.5 km, 4 A; and from 1.5 km onwards, 8 A. If, after the processor 56 adjusts the transmission voltage at step 518, the transmission current remains under the current ceiling, the processor 56 returns to step 516 to determine whether the transmission voltage needs to be adjusted again. If, however, after the processor 56 adjusts the transmission voltage at step 518, the transmission current exceeds the current ceiling, the processor 56 proceeds to step 522 where it decrements the transmission voltage by a predetermined step, such as by 10% of its current magnitude, to attempt to reduce the transmission current to or below the current ceiling. The processor 56 continues to check the value of the transmission current (step 523) and decrements the transmission voltage (step 522) until the transmission current is at or below the current ceiling. After the transmission voltage is adjusted to a value that results in an acceptable transmission current, the processor 56 proceeds to step 524 and the method 500 ends.

Steps 504 to 514 describe the voltage limiting mode. At step 504, the processor 56 determines whether the transmission current is equal to a configuration current ("$I_{config}$" in FIG. 5A). The configuration current is stored in a configuration file stored in the memory 58. The configuration file contains a list of configuration currents suitable for different depths of the well and may be generated based on data regarding what transmission currents or current ranges were found to be suitable for use in EM telemetry in wells geographically near the well being drilled. If the transmission current substantially equals the configuration current, then the processor 56 does not adjust the transmission current and loops back to step 504 in anticipation of an eventual deviation of the transmission current from the configuration current. By "substantially equals", it is meant that the transmission current and the configuration current are within a certain tolerance percentage of each other; this tolerance percentage may vary with the application and with the desires of the rig operator. Exemplary tolerance percentages include any tolerances between 0% and 10%, inclusively, such as +/−1%, +/−5%, and +/−10%.

If the transmission current and the configuration current differ, the processor 56 proceeds to step 506 where it adjusts the transmission current to approach the configuration current. The processor 56 does this by adjusting the voltage that the signal generator 76 outputs to the voltage regulator 72, which consequently adjusts the transmission current depending on the resistance of the formation through which the EM telemetry signal propagates. In the depicted embodiment, instead of adjusting the transmission current to immediately equal the configuration current, the processor 56 adjusts the transmission current in steps by correspondingly adjusting the transmission voltage in steps (e.g. in 0.25 V increments) so as to mitigate against the risk that an unexpectedly large increase in the transmission current will result. For example, if the EM signal transmitter 13 is transmitting the EM telemetry signal through a formation of unexpectedly low resistance, increasing the transmission voltage too quickly to increase the transmission current may result in a transmission current being drawn that damages the EM signal transmitter 13. The stepwise increase in the transmission current thus helps to protect electrical circuitry.

After increasing the transmission current, the processor 56 proceeds to step 508 where it determines the transmission voltage and compares it to a feedback parameter cutoff threshold in the form of a voltage ceiling ("$V_{ceiling}$" in FIG. 5A), which is the highest voltage that the EM signal transmitter 13 can safely use. In the depicted embodiment, the voltage ceiling is approximately 10 V, although in alternative embodiments (not depicted) the voltage ceiling can be other values and, for example, can be a range of values such as between 5 V and 10 V. If, after the processor 56 adjusts the transmission current at step 506, the transmission voltage remains under the voltage ceiling, the processor 56 returns to step 504 to determine whether the transmission current needs to be adjusted again. If, however, after the processor 56 adjusts the transmission current at step 506 the transmission voltage exceeds the voltage ceiling, as determined at step 508, the processor 56 proceeds to step 514 where it decrements the transmission current by a predetermined step, such as by 5% of its current magnitude, to attempt to reduce the transmission voltage to or below the voltage ceiling. The processor 56 continues to check the value of the transmission voltage (step 515) and decrements the transmission current (step 514) until the transmission voltage is at or below the voltage ceiling. After the transmission current is reduced to a value corresponding to an acceptable transmission voltage, the processor 56 proceeds to step 524 where the method 500 ends. If at step 508 the processor 56 determines that the transmission voltage is less than the voltage ceiling, the processor 56 proceeds to step 510 where it compares the transmission voltage to a feedback parameter cutoff threshold in the form of a voltage floor ("$V_{floor}$" in FIG. 5A). The voltage floor is the lowest voltage at which the EM telemetry signal can be transmitted to the surface from downhole. If the transmission voltage is less than the voltage floor, the processor 56 shuts the EM signal transmitter 13 down at step 512 following which the method 500 ends at step 524. If the transmission voltage equals or exceeds the voltage floor, the processor 56 returns to step 504 where it again compares the transmission current to the configuration current to determine whether the transmission current is to be adjusted. In alternative embodiments (not depicted), the voltage floor is specified in the configuration file and increases with depth to reflect the increased voltage typically used to transmit signals to surface from a position relatively deep in the earth.

Figure 5B:
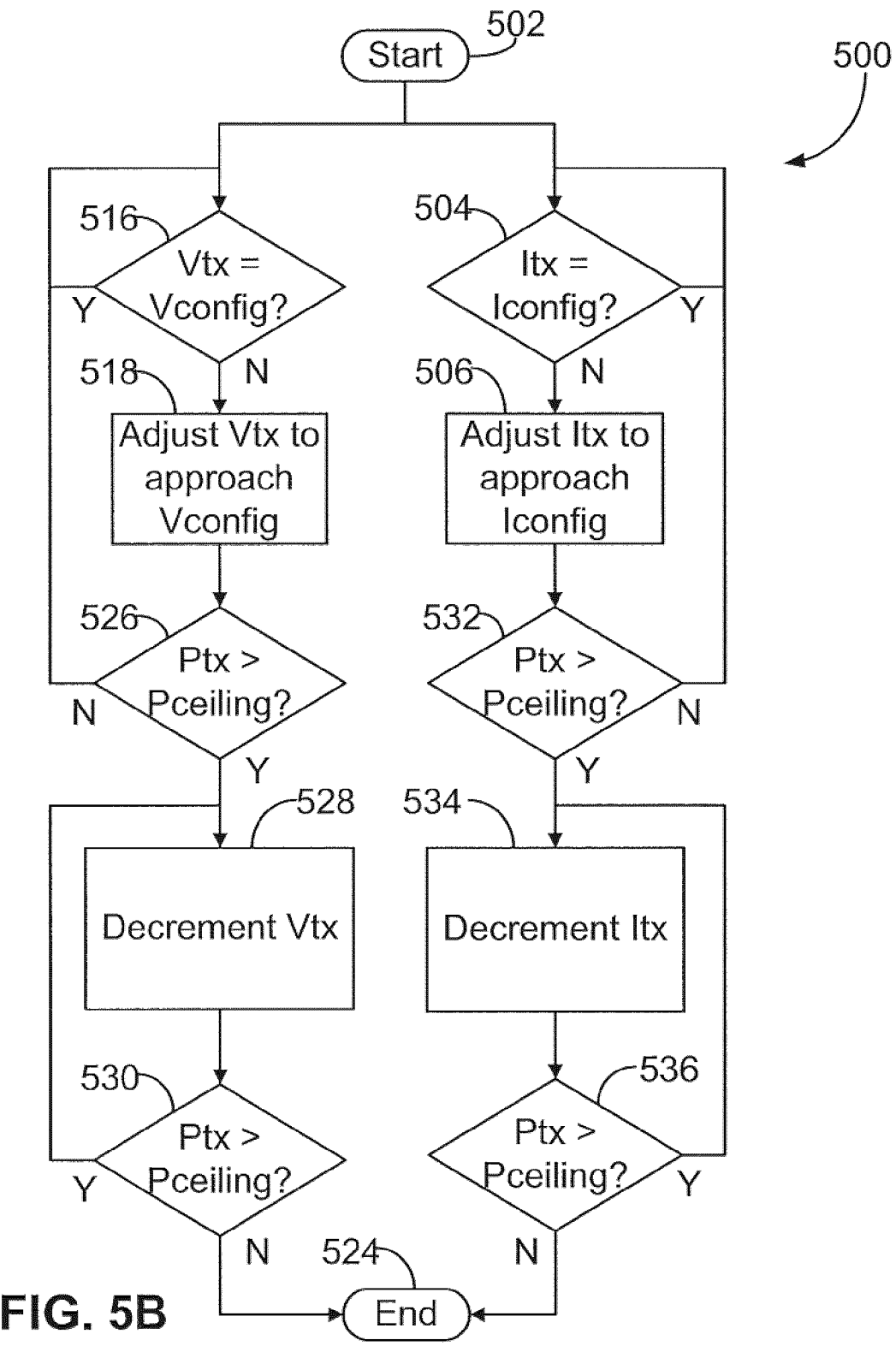

In an alternative embodiment of the method 500 for regulating the EM telemetry signal, which is shown in FIG. 5B, regardless of whether the controlled parameter is transmission current or transmission voltage, the processor 56 monitors the power used to generate the EM telemetry signal ("transmission power", represented using "$P_{tx}$" in FIG. 5B) and adjusts transmission current or voltage in response to the transmission power. The processor 56 determines the transmission power by determining the product of the transmission voltage and transmission current. Instead of operating in voltage limiting mode or current limiting mode as it does when performing the method 500 of FIG. 5A, when performing the method 500 of FIG. 5B the EM signal transmitter 13 operates in "power limiting mode" regardless of whether the controlled parameter is transmitter voltage or transmitter current.

In the embodiment of FIG. 5B, if the controlled parameter is transmitter voltage the processor 56 proceeds from step 502 to steps 516 and 518 and performs those steps in the manner as described above in respect of FIG. 5A. After having adjusted the transmission voltage to approach the configuration voltage at step 518, the processor 56 proceeds to block 526 where it determines whether the transmission power exceeds a power cutoff threshold, which in the embodiment of FIG. 5B is a maximum power value ("power ceiling"). The value of the power ceiling is stored in the configuration file and may vary with variables such as current depth and the nature of the formation being drilled. The power ceiling value may represent the maximum power the EM signal transmitter 13 can safely transmit, or the maximum power the EM signal transmitter 13 can transmit while maintaining satisfactory battery life. If the transmission power does not exceed the power ceiling, the processor 56 loops back to step 516. However, if the transmission power does exceed the power ceiling, the processor 56 proceeds to step 528 where it decrements the transmission voltage, which reduces the transmission power, and then proceeds to step 530 where it again determines whether the transmission power exceeds the power ceiling. If it does, the processor 56 loops back to step 528 and again decrements the transmission voltage. If, however, the transmission power is less than the power ceiling, the processor 56 proceeds to step 524 where the method 500 ends.

If the controlled parameter is transmitter current, the processor 56 proceeds from step 502 to steps 504 and 506 and performs those steps in the manner described above in respect of FIG. 5A. After having adjusted the transmission current to approach the configuration current at step 506, the processor 56 proceeds to block 532 where it determines whether the transmission power exceeds the power ceiling. If the transmission power does not exceed the power ceiling, the processor 56 loops back to step 504. However, if the transmission power does exceed the power ceiling, the processor 56 proceeds to step 534 where it decrements the transmission current, which reduces the transmission power, and then proceeds to step 530 where it again determines whether the transmission power exceeds the power ceiling. If it does, the processor 56 loops back to step 534 and again decrements the transmission current. If, however, the transmission power is less than the power ceiling, the processor 56 proceeds to step 524 where the method 500 ends.

In an alternative embodiment (not depicted), the power cutoff threshold may be a minimum power value ("power floor") instead of a power ceiling.

The processor 56 is optionally operable in a "dual voltage" mode, in which the EM signal transmitter 13 is able to send signals using either of two configuration voltages, namely: a low configuration voltage and a high configuration voltage, instead of a single configuration voltage. When the EM signal transmitter 13 sends signals using the low configuration voltage, it is operating in a "low voltage mode", and when it sends signals using the high configuration voltage, it is operating in a "high voltage mode". The configuration file described in respect of FIG. 5A may specify in which mode the EM signal transmitter 13 is to operate.

The different modes can be used in response to different drilling conditions and operating parameters. For example, when a water based drilling mud is used, resistance and the transmission voltage required to successfully transmit the EM telemetry signal to the surface tend to decrease. Analogously, when oil based drilling mud is used or air drilling is performed, or when drilling is done deep in a formation, impedance and the transmission voltage required to successfully transmit the EM telemetry signal to the surface tend to increase. When impedance is relatively low, the EM signal transmitter 13 may operate in the low voltage mode; analogously, when resistance is relatively high, the EM signal transmitter may operate in the high voltage mode. For example, while the low configuration voltage may be 5 V, the high configuration voltage may be 50 V. The processor 56 may switch between using the low and high configuration voltages in response to instructions contained in the configuration file by sending a control signal to the voltage regulator 72; for example, the configuration file may indicate that the low configuration voltage is to be used when transmitting from less than 1 km depth, and that the high voltage is to be used for transmissions made from anywhere deeper. To illustrate operation of the dual voltage mode, in one exemplary embodiment the battery 74 has a voltage of 36 V. To output a transmission voltage of 5 V, the processor 56 activates the step-down voltage regulator 78 and deactivates the step-up voltage regulator 80, thus stepping down the 36 V to 5 V and outputting the 5 V to the PWM driver 82. To output a transmission voltage of 50 V, the processor 56 activates the step-up voltage regulator 80 and deactivates the step-down voltage regulator 78, thus stepping up the 36 V to 50 V and outputting the 50 V to the PWM driver 82.

In another embodiment of the dual voltage mode, the processor 56 may determine the impedance through which the EM telemetry signal is to be transmitted. If the impedance exceeds a high impedance threshold, which may be specified in the configuration file, the processor 56 enters the high voltage mode; the processor 56 otherwise enters low voltage mode.

FIG. 5A references current and voltage ceilings and a voltage floor. In alternative embodiments (not depicted), the processor 56 also monitors the transmission current and transmission voltage and compares them to a reset current and a reset voltage. If the transmission current exceeds the reset current or the transmission voltage drops below the reset voltage, the processor 56 resets the entire electronics subassembly 36 to protect the electrical circuitry. If either the transmission current exceeds the reset current or the transmission voltage drops below the reset voltage, the processor 56 enters an interrupt routine and immediately resets the electronics subassembly 36.

Figure 6:
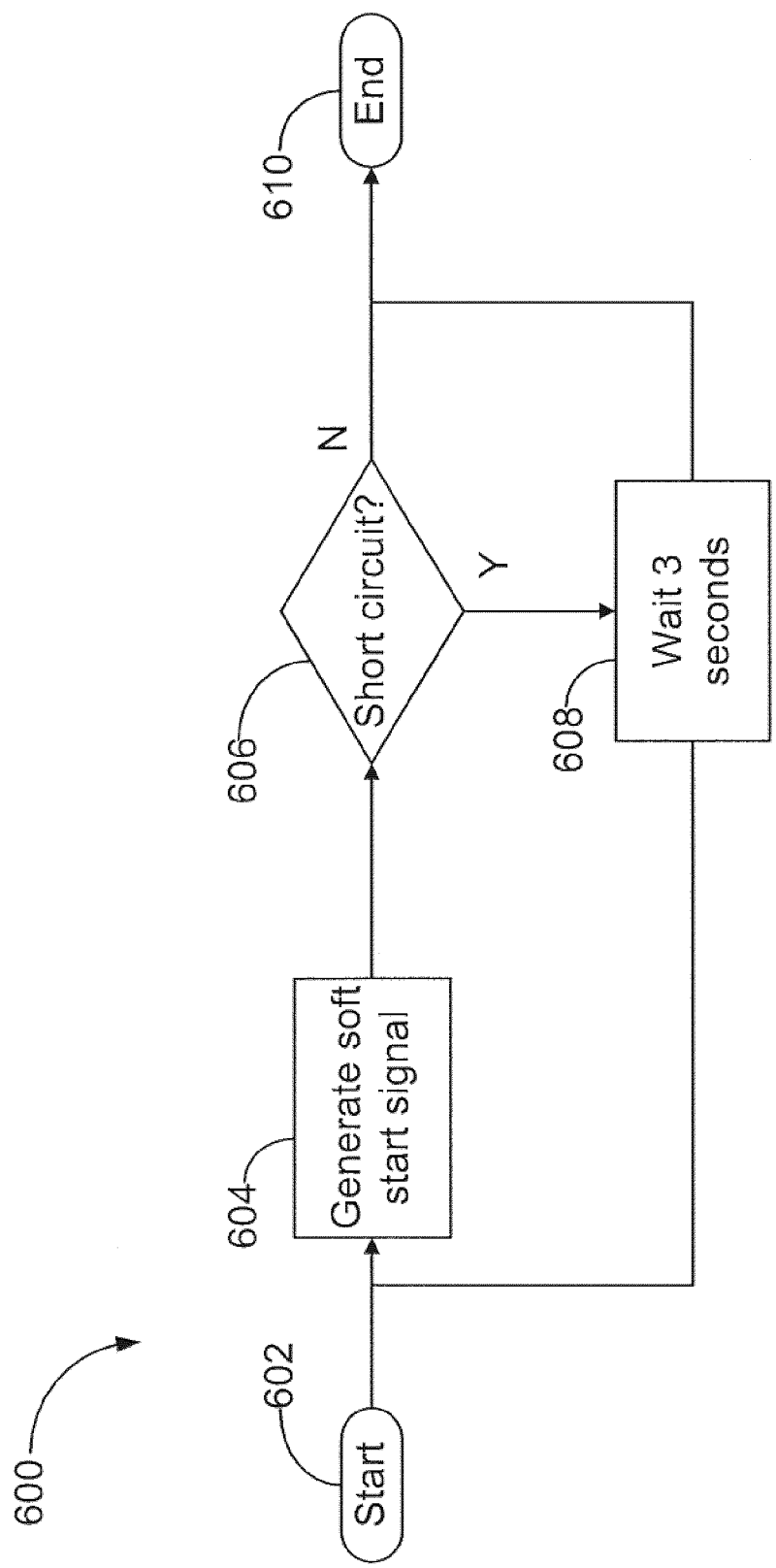
FIG. 6 is a flowchart depicting a method for restarting an EM signal transmitter that forms part of the EM telemetry tool, according to another embodiment.
Figure 7:
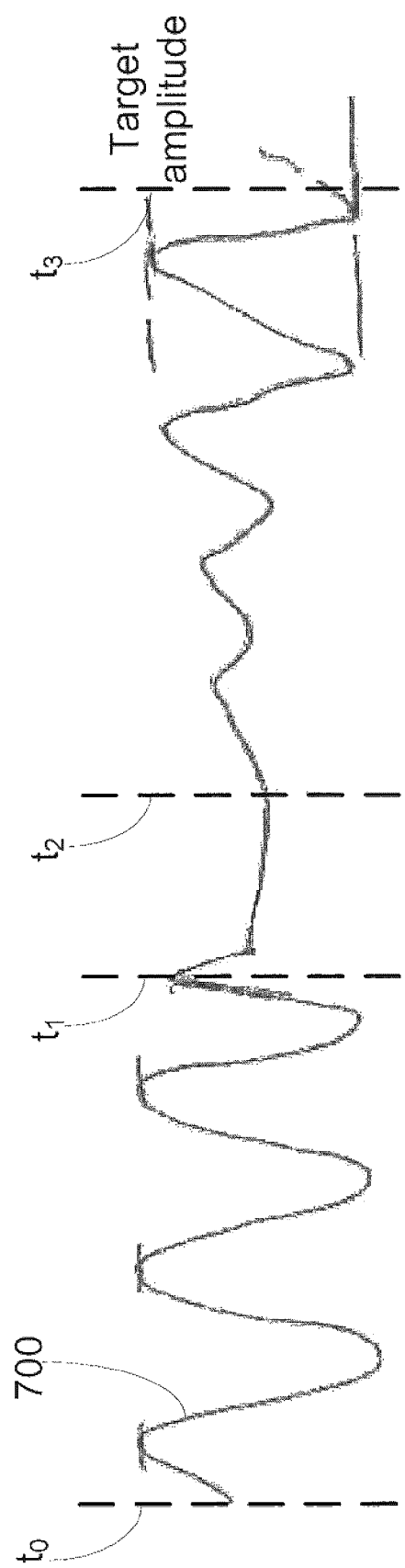
FIG. 7 is an exemplary waveform generated according to the method of FIG. 6.

Referring now to FIG. 6, there is shown a method 600 that the processor 56 performs to restart the EM signal transmitter 13 after it has been shutdown. The method 600 is designed to protect the circuitry of the EM signal transmitter 13 in the event that a short circuit (such as a casing short in which the female and male members 37,40 are electrically connected to each other via downhole casing) draws a dangerously high level of transmission current that could permanently damage the EM signal transmitter 13. The processor 56 determines whether a short circuit has occurred by monitoring the transmission current. The consequences of such a short circuit are shown in FIG. 7, which depicts an exemplary waveform 700 used as the EM telemetry signal. From time $t_0$ to $t_1$, the waveform 700 has constant amplitude and the EM signal transmitter 13 is operating with the transmission voltage equaling the configuration voltage and with the transmission current under the current ceiling. At time $t_1$, the processor 56 detects a rapid increase in transmission current, concludes that a short circuit has occurred, and consequently shuts down the EM signal transmitter 13. From shortly after time $t_1$ to time $t_2$ the waveform 700 accordingly has no amplitude.

At time $t_2$, the processor 56 proceeds to step 604 from step 602 and generates a "soft start" signal. A soft start signal refers to a signal that gradually increases in amplitude towards a target amplitude instead of instantaneously being set to equal the target amplitude. In the event a short circuit such as the casing short is still present when the processor 56 attempts to restart the EM signal transmitter 13, gradually increasing voltage helps to limit the transmission current drawn when the circuit is shorted, thereby helping to protect the circuitry of the EM signal transmitter 13. In FIG. 7, the processor 56 implements the soft start signal by increasing the amplitude of the waveform 700 at roughly 5% per cycle until the target amplitude is reached at time $t_3$. To adjust the amplitude of the waveform 700, the processor 56 correspondingly adjusts the amplitude of the output waveform of the signal generator 76.

In the event there is a casing short, the processor 56 detects the short (step 606) by virtue of the relatively large transmission current draw and proceeds to step 608 where it waits for a delay period in the anticipation that the casing short will pass as a result of drill string movement. In the depicted embodiment, the delay period is 3 seconds; however, in alternative embodiments the delay period may be more or less than 3 seconds and may vary with drilling conditions. After the delay period has passed, the processor 56 returns to step 604 to generate the soft start signal again. The processor 56 repeats steps 604 to 608 until the casing short passes, following which the processor 56 proceeds to step 610 from step 606 and the method 600 ends.

While in the depicted embodiments the configuration file is used to control transmission voltage and current, in alternative embodiments (not depicted) the configuration file may also be used to control other variables; examples of these variables include signal phase, signal modulation type, the kind of data to send, and amplitude modes. Any one or more of these variables can be indexed by depth in the configuration file, for example, such that the variables change as specified in the configuration file as drilling progresses.

The downhole processor used in the foregoing embodiments may be, for example, a microprocessor, microcontroller, digital signal processor, programmable logic controller, field programmable gate array, or an application-specific integrated circuit. Examples of the computer readable medium are non-transitory and include disc-based media such as CD-ROMs and DVDs, magnetic media such as hard drives and other forms of magnetic disk storage, semiconductor based media such as flash media, random access memory, and read only memory.

It is contemplated that any part of any aspect or embodiment discussed in this specification can be implemented or combined with any part of any other aspect or embodiment discussed in this specification.

For the sake of convenience, the exemplary embodiments above are described as various interconnected functional blocks. This is not necessary, however, and there may be cases where these functional blocks are equivalently aggregated into a single logic device, program or operation with unclear boundaries. In any event, the functional blocks can be implemented by themselves, or in combination with other pieces of hardware or software.

While particular embodiments have been described in the foregoing, it is to be understood that other embodiments are possible and are intended to be included herein. It will be clear to any person skilled in the art that modifications of and adjustments to the foregoing embodiments, not shown, are possible.

The invention claimed is:

1. A method for regulating an electromagnetic ("EM") telemetry signal sent from downhole to surface, the method comprising:
    (a) determining a value of a controlled parameter of the EM telemetry signal, wherein the controlled parameter comprises one of transmission voltage and transmission current;
    (b) comparing the value of the controlled parameter to a configuration value;
    (c) when the value of the controlled parameter differs from the configuration value, adjusting the value of the controlled parameter in a first direction towards the configuration value while monitoring a feedback parameter of the EM telemetry signal, wherein the feedback parameter comprises the other of the transmission voltage and transmission current and varies in response to variations of the controlled parameter;
    (d) determining a product of the controlled and feedback parameters;
    (e) comparing the product of the controlled and feedback parameters to a power cutoff threshold; and
    (f) ceasing to adjust the value of the controlled parameter in the first direction upon the product of the controlled and feedback parameters meeting the power cutoff threshold.

2. The method of claim 1 wherein monitoring the feedback parameter comprises measuring the feedback parameter every half cycle of the EM telemetry signal.

3. The method of claim 1 wherein the controlled parameter is voltage and the feedback parameter is current.

4. The method of claim 1 wherein the controlled parameter is current and the feedback parameter is voltage.

5. The method of claim 3 wherein the product of the controlled and feedback parameters meets the power cutoff threshold when the product exceeds a power ceiling.

6. The method of claim 5 wherein the power ceiling varies inversely with resistance of a formation through which the EM telemetry signal propagates.

7. The method of claim 5 wherein the power ceiling varies directly with distance the EM telemetry signal travels from downhole to surface.

8. The method of claim 3 wherein the product of the controlled and feedback parameters meets the power cutoff threshold when the product is less than a power floor.

9. The method of claim 8 wherein the power floor varies directly with distance the EM telemetry signal travels from downhole to surface.

10. The method of claim 1 further comprising, when commencing transmission of the EM telemetry signal, gradually increasing the amplitude of the signal towards a target amplitude.

11. The method of claim 10 wherein the amplitude of the signal increases by a certain percentage per cycle.

12. The method of claim 10 further comprising:
    (a) determining whether a short circuit is present; and
    (b) when the short circuit is present:
        (i) decreasing the amplitude of the signal to zero;
        (ii) waiting by a delay period; and
        (iii) commencing transmission of the signal again.

13. A system for regulating an electromagnetic ("EM") telemetry signal sent from downhole to surface, the system comprising:
    (a) an EM signal transmitter configured to generate the EM telemetry signal; and
    (b) an electronics subassembly communicative with the EM signal transmitter and comprising a processor and a memory having encoded thereon statements and instructions to cause the processor to perform a method for regulating the EM telemetry signal, the method comprising:
        (i) determining a value of a controlled parameter of the EM telemetry signal, wherein the controlled parameter comprises one of transmission voltage and transmission current;
        (ii) comparing the value of the controlled parameter to a configuration value;
        (iii) when the value of the controlled parameter differs from the configuration value, adjusting the value of the controlled parameter in a first direction towards the configuration value while monitoring a feedback parameter of the EM telemetry signal, wherein the feedback parameter comprises the other of the transmission voltage and transmission current and varies in response to variations of the controlled parameter;
        (iv) determining a product of the controlled and feedback parameters;
        (v) comparing the product of the controlled and feedback parameters to a power cutoff threshold; and
        (vi) ceasing to adjust the value of the controlled parameter in the first direction upon the product of the controlled and feedback parameters meeting the power cutoff threshold.

14. The system of claim 13 further comprising a gap sub, and wherein the EM signal transmitter comprises an H-bridge circuit electrically coupled to positive and negative ends of the gap sub such that applying a voltage across a positive pathway of the H-bridge circuit generates the positive polarity EM pulse, and applying a voltage across a negative pathway of the H-bridge circuit generates the negative polarity EM pulse.

15. The system of claim 14 wherein the EM signal transmitter further comprises a voltage regulator electrically coupled to the H-bridge circuit, a power source coupled to the voltage regulator, and a signal generator communicative with the voltage regulator, the H-bridge circuit, and the electronics subassembly, the signal generator configured to receive the control signal from the processor and to send a polarity control signal to the H-bridge circuit and a voltage output and timing control signal to the voltage regulator.

16. The system of claim 13 wherein the electronics subassembly further comprises a sensor and a sensor voltage regulator electrically coupled to the sensor, wherein the sensor voltage regulator produces a regulated voltage output to power the sensor.

17. A non-transitory computer readable medium having encoded thereon statements and instructions to cause a processor to perform a method for regulating an electromagnetic ("EM") telemetry signal sent from downhole to surface, the method comprising:

(a) determining a value of a controlled parameter of the EM telemetry signal, wherein the controlled parameter comprises one of transmission voltage and transmission current;
(b) comparing the value of the controlled parameter to a configuration value;
(c) when the value of the controlled parameter differs from the configuration value, adjusting the value of the controlled parameter in a first direction towards the configuration value while monitoring a feedback parameter of the EM telemetry signal, wherein the feedback parameter comprises the other of the transmission voltage and transmission current and varies in response to variations of the controlled parameter;
(d) determining a product of the controlled and feedback parameters;
(e) comparing the product of the controlled and feedback parameters to a power cutoff threshold; and
(f) ceasing to adjust the value of the controlled parameter in the first direction upon the product of the controlled and feedback parameters meeting the power cutoff threshold.

* * * * *